United States Patent
Higuchi et al.

(10) Patent No.: US 10,167,902 B2
(45) Date of Patent: Jan. 1, 2019

(54) MANUFACTURING METHOD OF ROTATING ELEMENT, CONNECTING STRUCTURE BETWEEN ROTATING ELEMENT AND ROTATING SHAFT, AND STEERING APPARATUS

(71) Applicants: JTEKT CORPORATION, Osaka-shi, Osaka (JP); KOYO MACHINE INDUSTRIES CO., LTD., Yao-shi, Osaka (JP)

(72) Inventors: Taisho Higuchi, Osaka (JP); Takeshi Koyama, Neyagawa (JP); Taiki Yamamura, Takaishi (JP)

(73) Assignees: JTEKT CORPORATION, Osaka-shi (JP); KOYO MACHINE INDUSTRIES CO., LTD., Yao-shi (JP)

( * ) Notice: Subject to any disclaimer, the term of this patent is extended or adjusted under 35 U.S.C. 154(b) by 292 days.

(21) Appl. No.: 15/200,958

(22) Filed: Jul. 1, 2016

(65) Prior Publication Data

US 2017/0009814 A1    Jan. 12, 2017

(30) Foreign Application Priority Data

Jul. 9, 2015    (JP) ................................. 2015-138048

(51) Int. Cl.
*F16D 3/38* (2006.01)
*B62D 1/02* (2006.01)
(Continued)

(52) U.S. Cl.
CPC .............. *F16D 3/387* (2013.01); *B23P 15/00* (2013.01); *B62D 1/02* (2013.01); *B62D 1/20* (2013.01);
(Continued)

(58) Field of Classification Search
CPC ......... F16D 3/387; F16D 1/0864; B62D 1/20; B62D 1/02; B23P 15/00; B23P 2700/11
See application file for complete search history.

(56) References Cited

U.S. PATENT DOCUMENTS 4,505,608 A * 3/1985 Haldric ................. B21D 53/84
29/896.7
2005/0218642 A1 10/2005 Yamaguchi et al.
2010/0109273 A1 5/2010 Moriyama et al.

FOREIGN PATENT DOCUMENTS

| JP | 2012-021594 A | 2/2012 |
| JP | 2013-133898 A | 7/2013 |
| WO | 2008/136445 A1 | 11/2008 |

OTHER PUBLICATIONS

Nov. 24, 2016 Extended Search Report issued in European Patent Application No. 16177975.6.

* cited by examiner

*Primary Examiner* — Ryan J Walters
(74) *Attorney, Agent, or Firm* — Oliff PLC (57) ABSTRACT

A manufacturing method of a rotating element including a cylindrical fitting portion having a pair of circumferential end portions forming an axial slit between the circumferential end portions, the cylindrical fitting portion being serration-fitted to a rotating shaft, includes: clamping the fitting portion by a clamp jig so that the fitting portion is elastically deformed in an elliptical shape; forming a female serration arranged in an elliptical shape by use of a tool having an elliptical section, the female serration being formed on an inner peripheral surface of the fitting portion elastically deformed in the elliptical shape; and releasing the clamping by the clamp jig so that the arrangement of the female serration is changed to a perfect-circle shape from the elliptical shape.

3 Claims, 6 Drawing Sheets

(51) Int. Cl.
*F16D 1/08* (2006.01)
*B23P 15/00* (2006.01)
*B62D 1/20* (2006.01)
(52) U.S. Cl.
CPC ........ *F16D 1/0864* (2013.01); *B23P 2700/11* (2013.01)

MANUFACTURING METHOD OF ROTATING ELEMENT, CONNECTING STRUCTURE BETWEEN ROTATING ELEMENT AND ROTATING SHAFT, AND STEERING APPARATUS

INCORPORATION BY REFERENCE

The disclosure of Japanese Patent Application No. 2015-138048 filed on Jul. 9, 2015 including the specification, drawings and abstract is incorporated herein by reference in its entirety.

BACKGROUND OF THE INVENTION

1. Field of the Invention

The present invention relates to a manufacturing method of a rotating element, a connecting structure between a rotating element and a rotating shaft, and a steering apparatus.

2. Description of Related Art

There has been proposed a technique related to a connecting structure between a male shaft and a female shaft, in which interference-fit parts and running-fit parts are placed alternately on a circumference in a connection portion with a male serration or a female serration (see Japanese Patent Application Publication No. 2012-21594 (JP 2012-21594 A), for example). Further, there has been proposed a technique related to a connection portion between a rotating shaft and a yoke of a universal joint, in which a circumferential shape of a top of a crest part of a male serration portion is a partially arc shape or a linear shape, and an uneven portion is provided in the top over an axial direction (see Japanese Patent Application Publication No. 2013-133898 (JP 2013-133898 A), for example).

SUMMARY OF THE INVENTION

Generally, when a female serration is formed in a fitting portion to which a rotating shaft is connected, the fitting portion is clamped with a predetermined clamping force. The fitting portion in a state which the clamping force is applied thereto is, however, deformed in an elliptical shape so that the fitting portion becomes flat in a clamping direction. When the clamping is released after the female serration is formed on an inner peripheral surface of the fitting portion deformed in an elliptical shape, by use of a broach or the like in which machining teeth on an outer periphery are arranged in a perfect-circle shape, the fitting portion is restored from a deformed state, so that the female serration is not arranged in a perfect-circle shape.

When a male serration arranged in a perfect-circle shape on an outer peripheral surface of the rotating shaft is engaged with the female serration arranged in a non-perfect-circle shape on the inner peripheral surface of the fitting portion, a tooth contact becomes worse, which causes a decrease in durability. The present invention provides a manufacturing method of a rotating element which is able to provide a female serration arranged in a perfect-circle shape on an inner peripheral surface of a fitting portion and which is excellent in durability, a connecting structure between the rotating element manufactured by the manufacturing method and a rotating shaft, and a steering apparatus including the connecting structure.

A first aspect of the present invention relates to a manufacturing method of a rotating element including a cylindrical fitting portion having a pair of circumferential end portions forming an axial slit between the circumferential end portions, the cylindrical fitting portion being serration-fitted to a rotating shaft, and the manufacturing method includes: clamping the fitting portion by a clamp jig so that the fitting portion is elastically deformed in an elliptical shape that is flat in a predetermined radial direction toward the axial slit; forming a female serration arranged in an elliptical shape by use of a tool having an elliptical section with a short diameter in the predetermined radial direction, the female serration being formed on an inner peripheral surface of the fitting portion clamped by the clamp jig so as to be elastically deformed in the elliptical shape; and releasing the clamping by the clamp jig so that the arrangement of the female serration is changed to a perfect-circle shape from the elliptical shape.

In the above aspect, the female serration is formed to be arranged in an elliptical shape on the inner peripheral surface of the fitting portion at a manufacturing stage by use of the tool having an elliptical section with the short diameter in the predetermined radial direction. The fitting portion is clamped so as to be flat in the predetermined radial direction. When the clamping is released after that, it is possible to obtain the female serration arranged in a perfect-circle shape. This makes it possible to obtain a successful tooth contact at the time when the female serration is engaged with a male serration, thereby making it possible to improve durability of the rotating element.

In the above aspect, a difference between a long diameter and a short diameter of an ellipse formed by the inner peripheral surface of the fitting portion clamped by the clamp jig may be equal to a difference between a long diameter and a short diameter of an ellipse formed by the tool.

In the above configuration, the female serration is formed to be arranged in the elliptical shape, by use of the elliptical tool having a flatness degree that accords with a flatness degree (a difference between the long diameter and the short diameter) of the ellipse at the time when the fitting portion at the manufacturing stage is clamped. This accordingly makes it possible to obtain the female serration having an arrangement closer to a perfect circle, after the clamping is released.

In the above aspect, the difference between the long diameter and the short diameter of the ellipse formed by the tool may be larger than a deviation amount of the difference between the long diameter and the short diameter of the ellipse formed by the inner peripheral surface of the fitting portion clamped by the clamp jig.

In the above configuration, the flatness degree at the time when the fitting portion at the manufacturing stage is clamped tends to vary within a given deviation amount. In this regard, the female serration is formed by use of the elliptical tool having a flatness degree larger than the deviation amount. This accordingly makes it possible to obtain the female serration having an arrangement closer to a perfect circle, after the clamping is released.

A connecting structure according to a second aspect of the present invention includes: a rotating element manufactured by the manufacturing method according to the above aspect; and a rotating shaft having a male serration provided on an outer peripheral surface of the rotation shaft, the rotating shaft being serration-fitted to the fitting portion.

In the above aspect, a tooth contact between the male serration and the female serration improves and durability thereof improves.

A steering apparatus according to a third aspect of the present invention includes the connecting structure of the above aspect. The rotating element is a universal joint yoke of a universal joint. The rotating shaft is an intermediate shaft.

According to the above aspect, it is possible to improve the durability.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 2:
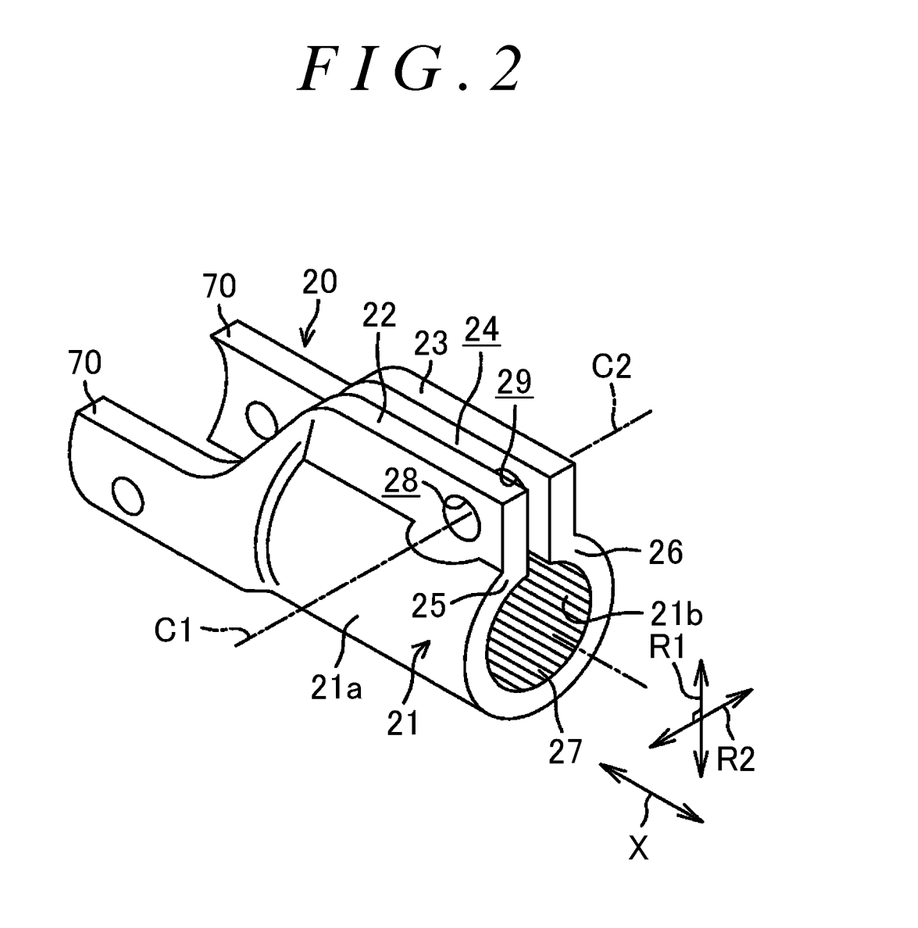
FIG. 2 is a perspective view of a universal joint yoke as the rotating element manufactured by the manufacturing method according to the first embodiment.

Embodiments of the present invention will be described with reference to the attached drawings. FIG. 2 is a perspective view of a universal joint yoke 20 as a rotating element manufactured by a manufacturing method according to a first embodiment of the present invention. As illustrated in FIG. 2, the universal joint yoke 20 as the rotating element includes a fitting portion 21 extending in an axial direction X, and a pair of clamp plates 22, 23 extended from the fitting portion 21. The fitting portion 21 has a cylindrical shape having a C-shaped section and extends in the axial direction X. That is, the fitting portion 21 includes a pair of circumferential end portions 25, 26 that section an axial slit 24 extending therebetween in the axial direction X.

The fitting portion 21 includes an outer peripheral surface 21a and an inner peripheral surface 21b. A female serration 27 arranged in a perfect-circle shape is formed on the inner peripheral surface 21b of the fitting portion 21. Although not illustrated herein, a rotating shaft is inserted into the fitting portion 21. A male serration is arranged in a perfect-circle shape on an outer peripheral surface of the rotating shaft. When the fitting portion 21 is reduced in diameter, the rotating shaft is fitted to be fixed by the fitting portion 21. The fitting portion 21 has a first radial direction R1 running through the axial slit 24, and a second radial direction R2 perpendicular to the first radial direction R1.

A pair of clamp plates 22, 23 extend from the pair of circumferential end portions 25, 26 of the fitting portion 21 in parallel with the first radial direction R1. A bolt insertion hole 28 is formed in one clamp plate 22. A screw thread hole 29 is formed in the other clamp plate 23. A central axis C1 of the bolt insertion hole 28 and a central axis C2 of the screw thread hole 29 are placed on the same axis. When a fastening bolt (not shown) passes through the bolt insertion hole 28 so as to be screwed into the screw thread hole 29, the pair of clamp plates 22, 23 are brought close each other. As a result, the fitting portion 21 is elastically reduced in diameter, so that the rotating shaft is fitted to be fixed within the fitting portion 21.

A pair of arms 70 are provided so as to extend in the axial direction X from one end (an end opposite to a side where the rotating shaft is connected) of the fitting portion 21 in the axial direction X. A pair of shaft portions of a joint cross (not shown) are connected to the arms 70. FIGS. 1A to 1E are process drawings illustrating a manufacturing method of a rotating element according to the first embodiment of the present invention.

Figure 1A:
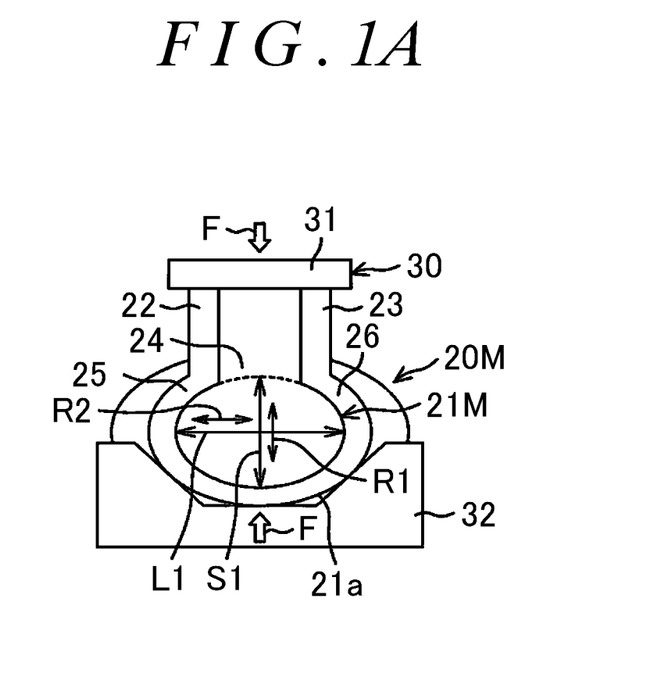
FIG. 1A is a process drawing illustrating a clamping step among steps of a manufacturing method of a rotating element according to a first embodiment of the present invention.
Figure 1B:
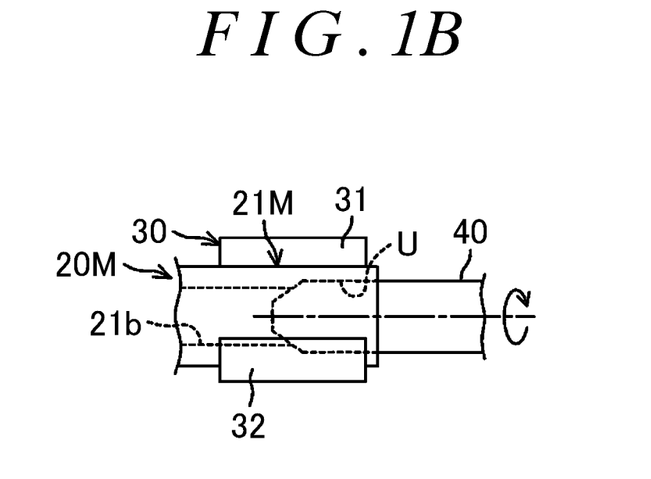
FIG. 1B is a process drawing illustrating a prepared-hole machining step among the steps of the manufacturing method of the rotating element according to the first embodiment of the present invention.
Figure 1C:
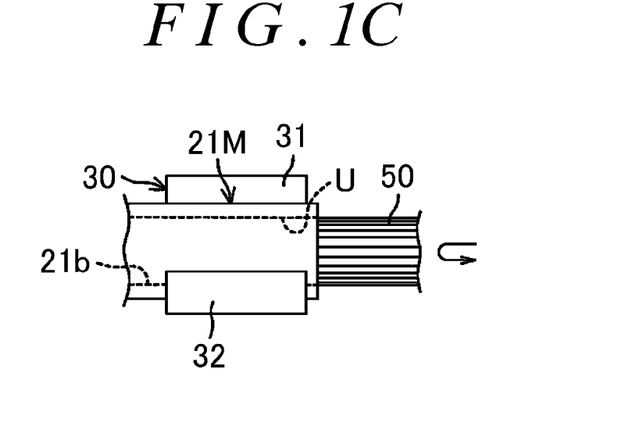
FIG. 1C is a process drawing illustrating a female-serration machining step among the steps of the manufacturing method of the rotating element according to the first embodiment of the present invention.
Figure 1D:
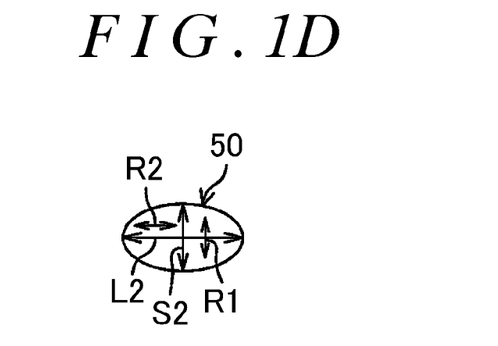
FIG. 1D is a schematic sectional view illustrating a tool used in the female-serration machining step among the steps of the manufacturing method of the rotating element according to the first embodiment of the present invention.
Figure 1E:
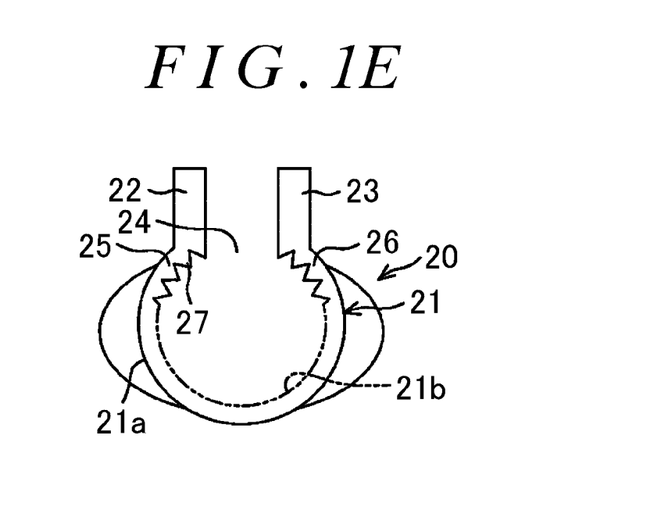
FIG. 1E is a process drawing illustrating a clamping release step among the steps of the manufacturing method of the rotating element according to the first embodiment of the present invention.

As illustrated in FIGS. 1A to 1E, the manufacturing method sequentially includes a clamping step [see FIG. 1A], a prepared-hole machining step [see FIG. 1B], a female-serration machining step [see FIGS. 1C, 1D], and a clamping release step [see FIG. 1E]. In the clamping step, as illustrated in FIG. 1A, a fitting portion 21M at a manufacturing stage in a universal joint yoke 20M at the manufacturing stage is clamped by a clamp jig 30 with a clamping force F so that the fitting portion 21M becomes flat in a first radial direction R1. At this time, the fitting portion 21M at the manufacturing stage and the pair of clamp plates 22, 23 are clamped together between a first clamp 31 and a second clamp 32 of the clamp jig 30.

That is, the clamp jig 30 includes the first clamp 31 that presses top ends of the pair of clamp plates 22, 23, and the second clamp 32 on a base side where the outer peripheral surface 21a of the fitting portion 21M is received. The base side is an opposite side to the pair of clamp plates 22, 23 (a side opposed thereto in the first radial direction R1). When the clamping force by the clamp jig 30 is applied to the fitting portion 21M at the manufacturing stage in the first radial direction R1, the fitting portion 21M at the manufacturing stage is elastically deformed in an elliptical shape that is flat in the first radial direction R1. Note that, as the first clamp 31, it is possible to provide a pair of members that press the pair of clamp plates 22, 23, respectively, as separate bodies.

As illustrated in FIG. 1B, in the prepared-hole machining step, a prepared hole U having a perfect-circle shape is formed, by use of a drill 40 as a tool, on an inner peripheral surface 21b of the fitting portion 21M at the manufacturing stage. The prepared hole U is formed to form a female serration. As illustrated in FIG. 1C, in the female-serration machining step, a female serration 27 arranged in an elliptical shape is formed on the inner peripheral surface 21b of the fitting portion 21M at the manufacturing stage by use of a broach 50. The prepared hole U is formed on the inner peripheral surface 21b of the fitting portion 21M at the manufacturing stage. As illustrated in FIG. 1D, the broach 50 is used as a tool having an elliptical section with a short diameter S2 in the first radial direction R1 and a long diameter L2 in the second radial direction R2.

Referring now to FIG. 1A, at the time when the fitting portion 21M at the manufacturing stage is clamped in the clamping step, a difference $\Delta 1B$ ($\Delta 1B = L1 - S1$) between a long diameter L1 and a short diameter S1 of an ellipse formed by the inner peripheral surface 21b of the fitting portion 21M becomes larger as the clamping force in the clamping step is larger. In the present embodiment, a difference between a long diameter and a short diameter of an ellipse is referred to as a flatness degree of the ellipse. Referring now to FIG. 1C, in the female-serration machining step, female-serration machining is performed by the broach 50 having an elliptical section in a state where the fitting portion 21M at the manufacturing stage is clamped so as to be deformed in an elliptical shape. On this account, it is preferable that a flatness degree of an ellipse formed by the section of the broach 50 be equal to a flatness degree of the fitting portion 21M at the manufacturing stage in a clamped state.

In view of this, in the present embodiment, as illustrated in FIG. 1C, a difference $\Delta 2$ ($\Delta 2 = L2 - S2$: flatness degree) between the long diameter L2 and the short diameter S2 of the ellipse formed by the broach 50 as the tool is set to be equal to the difference $\Delta 1B$ (flatness degree) between the long diameter L1 and the short diameter S1 of the ellipse formed by the inner peripheral surface 21b of the clamped fitting portion 21M at the manufacturing stage in the clamping step (that is, a formula $\Delta 1B = \Delta 2$ is established).

In the clamping release step illustrated in FIG. 1E, the clamping by the clamp jig 30 is released. When the clamping force is removed, the fitting portion 21M elastically deformed in an elliptical shape returns to the fitting portion 21 in a perfect-circle shape. Along with this, the female serration 27 arranged in a perfect-circle shape is obtained on the inner peripheral surface 21b of the fitting portion 21. In the present embodiment, the female serration 27 arranged in an elliptical shape is formed on the inner peripheral surface 21b of the fitting portion 21M at the manufacturing stage by use of the broach 50 as the tool having the elliptical section with the short diameter S2 in the first radial direction R1. The fitting portion 21M at the manufacturing stage is clamped so as to be flat in the first radial direction R1 (a predetermined radial direction). After that, by releasing the clamping, it is possible to obtain the female serration 27 arranged in a perfect-circle shape.

This makes it possible to obtain a successful tooth contact at the time when the female serration 27 is engaged with a male serration (not shown) as a counterpart, thereby making it possible to improve durability of the rotating element (the universal joint yoke 20). Since the durability is improved, it is possible to lower dimension accuracy of the female serration 27 or the male serration as its counterpart as much as possible. Particularly, the female serration 27 arranged in an elliptical shape is formed by the broach 50 having an elliptical section with a flatness degree (corresponding to the difference $\Delta 2$) that accords with the flatness degree (corresponding to the difference $\Delta 1B$) at the time when the fitting portion 21M at the manufacturing stage is clamped. This accordingly makes it possible to obtain the female serration 27 having an arrangement that is closer to a perfect circle, after the clamping is released.

Figure 3A:
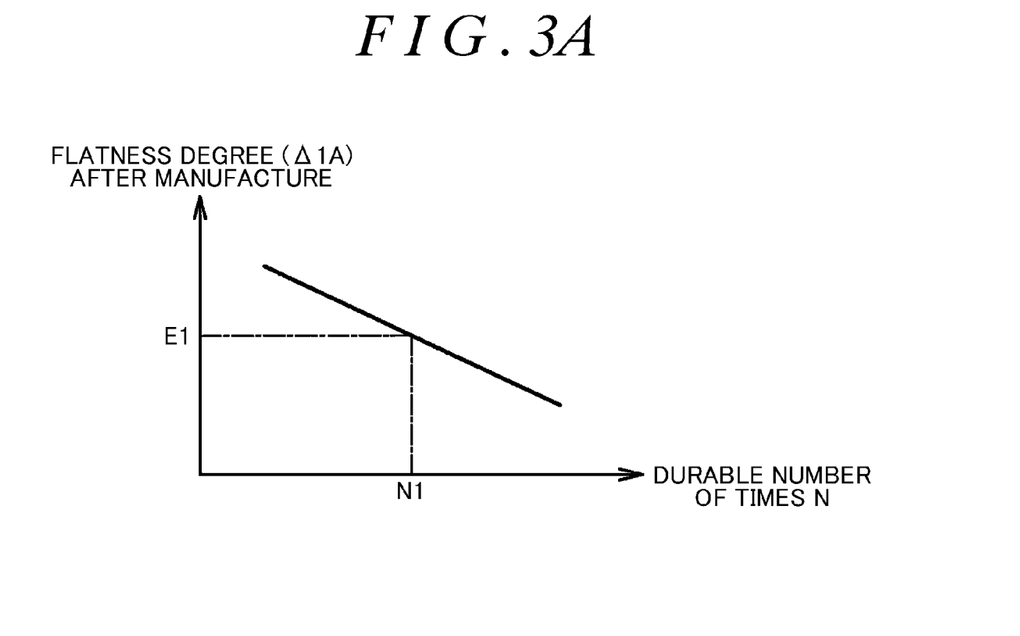
FIG. 3A is a graphical diagram illustrating a relationship between a durable number of times of the rotating element and a necessary flatness degree (corresponding to a difference Δ1A) of a manufactured fitting portion to achieve the durable number of times, in the first embodiment.

FIG. 3A is a graphical diagram illustrating a relationship between a flatness degree (corresponding to a difference $\Delta 1A$) of the fitting portion 21 of the rotating element (the universal joint yoke 20) after the manufacture and a durable number of times N at the time when a predetermined reciprocating running torque is applied in a state where the rotating element (the universal joint yoke 20) is connected to the rotating shaft. As illustrated in FIG. 3A, as the flatness degree (the difference $\Delta 1A$) of the fitting portion 21 after the manufacture is larger, the durable number of times N tends to gradually decrease. For example, in comparison with a characteristic line illustrated in FIG. 3A, in order to achieve a target durable number of times N1, it is necessary to set the flatness degree (the difference $\Delta 1A$) of the fitting portion 21 after the manufacture to be not more than a value E1 ($\Delta 1A \leq E1$).

Figure 3B:
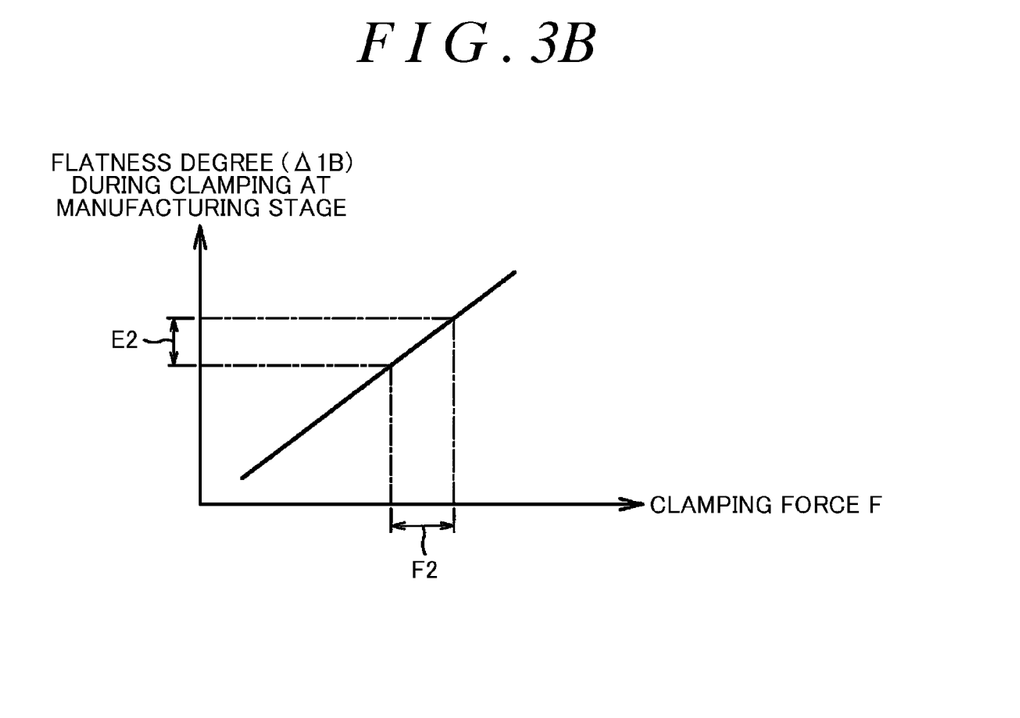
FIG. 3B a graphical diagram illustrating a relationship between a clamping force by a clamp jig and a flatness degree (corresponding to a difference Δ1B) of the fitting portion at a manufacturing stage at the time when the fitting portion is clamped, in the first embodiment.

Subsequently, FIG. 3B illustrates a relationship between the clamping force F by the clamp jig 30 and the flatness degree (corresponding to the difference $\Delta 1B$) of the fitting portion 21M at the manufacturing stage at the time when the fitting portion 21M is clamped. As illustrated in FIG. 3B, under the influence of variation or the like of dimension accuracy of each part of the universal joint yoke 20 as the rotating element, the clamping force F by the clamp jig 30 varies within a deviation amount F2 (a variation amount). On this account, the flatness degree (corresponding to the difference $\Delta 1B$) of the fitting portion 21M at the manufacturing stage at the time when the fitting portion 21M is clamped tends to vary within a deviation amount E2.

On this account, the flatness degree (the difference $\Delta 1A$) of the fitting portion 21 after the manufacture varies with a deviation amount that is generally equal to the deviation amount E2 of the flatness degree (the difference $\Delta 1B$) of the fitting portion 21M at the manufacturing stage at the time when the fitting portion 21M is clamped, as illustrated in FIG. 3B. Accordingly, in order that the flatness degree $\Delta 1A$ of the fitting portion 21 after the manufacture is not more than the value E1, it is preferable that the deviation amount E2 of the flatness degree $\Delta 1B$ of the fitting portion 21M at the manufacturing stage be less than the value E1 ($E2 < E1$). Conversely, it is preferable that the value E1 be larger than the deviation amount E2.

It is preferable that the flatness degree (corresponding to the difference $\Delta 2$) of the ellipse formed by the broach 50 be maximally larger than the deviation amount E2 of the flatness degree $\Delta 1B$ of the fitting portion 21M at the manufacturing stage ($E2 < \Delta 2$). In this case, the female serration 27 arranged in an elliptical shape is formed by the elliptical broach 50 having a flatness degree that takes into account the deviation amount E2 of the flatness degree (the difference $\Delta 1B$) at the time when the fitting portion 21M at the manufacturing stage is clamped. This accordingly makes it possible to obtain the female serration 27 having an arrangement that is closer to a perfect circle, after the clamping is released. More specifically, the flatness degree (the difference $\Delta 1A$) of the fitting portion 21 after the clamping is released becomes not more than the value E1 ($\Delta 1A \leq E1$) necessary for the achievement of the target durable number of times N1. The universal joint yoke 20 thus manufactured by the manufacturing method according to the first embodiment is applied to a connecting structure P between a rotating element and a rotating shaft according to a second embodiment of the present invention, as illustrated in a schematic view of FIG. 4. Further, the connecting structure P is applied to a steering apparatus 1 according to a third embodiment, as illustrated in a schematic view of FIG. 5.

Figure 5:
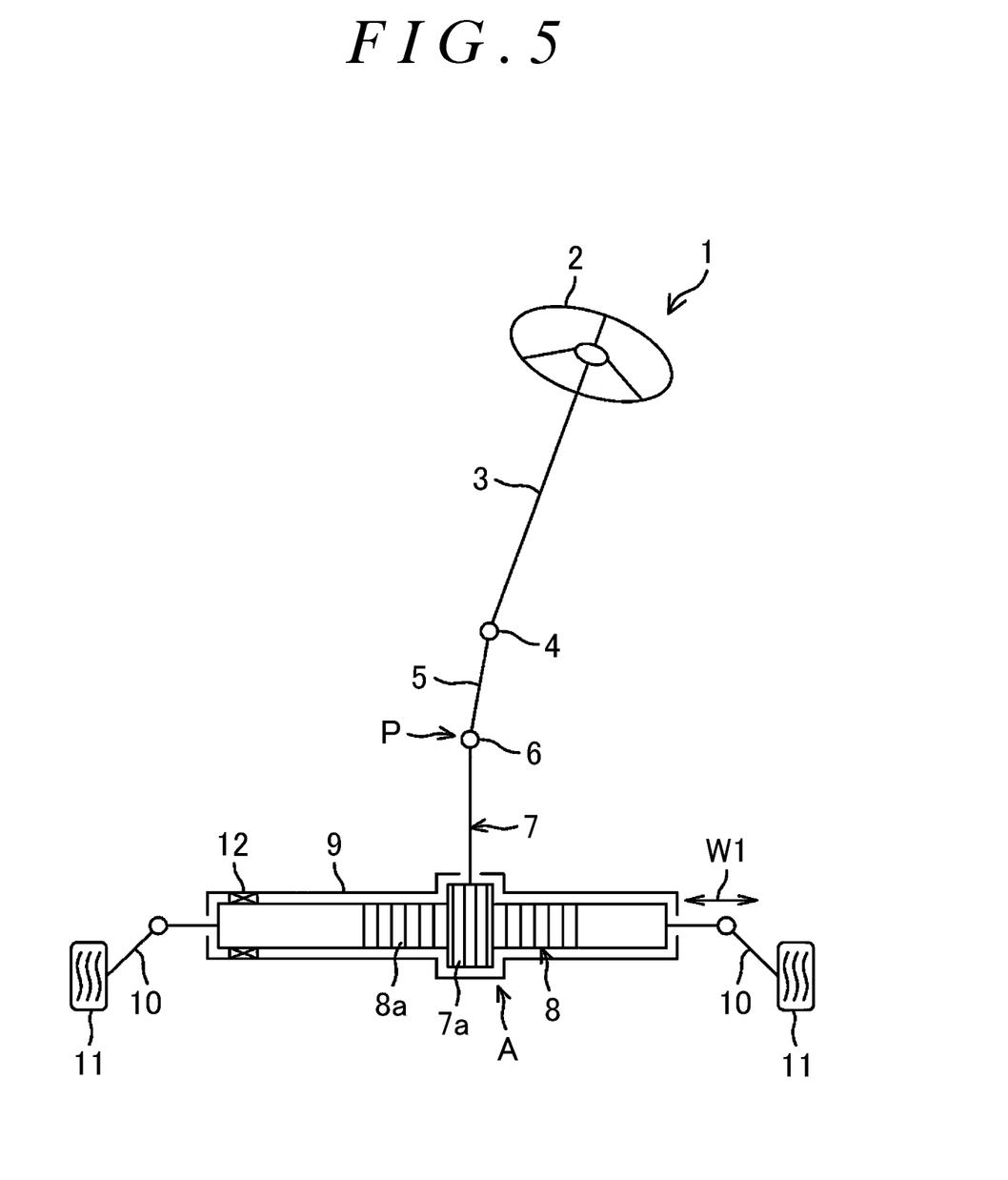
FIG. 5 is a schematic view of a steering apparatus according to a third embodiment of the present invention.

As illustrated in FIG. 5, the steering apparatus 1 includes: a steering shaft 3 having one end (an axially upper end) to which a steering member 2 such as a steering wheel is connected; and a steering operation mechanism A connected to the steering shaft 3 sequentially via a first universal joint 4, an intermediate shaft 5, and a second universal joint 6. The steering operation mechanism A is, for example, a rack-and-pinion mechanism that steers steered wheels 11 in conjunction with steerage of the steering member 2. The steering operation mechanism A includes: a pinion shaft 7 as an input shaft connected to the intermediate shaft 5 via the second universal joint 6; and a rack shaft 8 as an output shaft. A pinion 7a provided in the pinion shaft 7 is engaged with a rack 8a provided in the rack shaft 8.

A rotation of the steering member 2 is transmitted to the steering operation mechanism A sequentially via the steering shaft 3, the first universal joint 4, the intermediate shaft 5, and the second universal joint 6. The rack shaft 8 is supported inside a housing 9 fixed to a vehicle body, via a bearing (e.g., a rack bush 12 or the like as a slide bearing) so as to linearly reciprocate along an axial direction W1. Both end portions of the rack shaft 8 project toward outer sides relative to the housing 9, and respective tie rods 10 are connected to the end portions of the rack shaft 8. Each of the tie rods 10 is connected to a corresponding steered wheel 11 via a corresponding knuckle arm (not shown).

Figure 4:
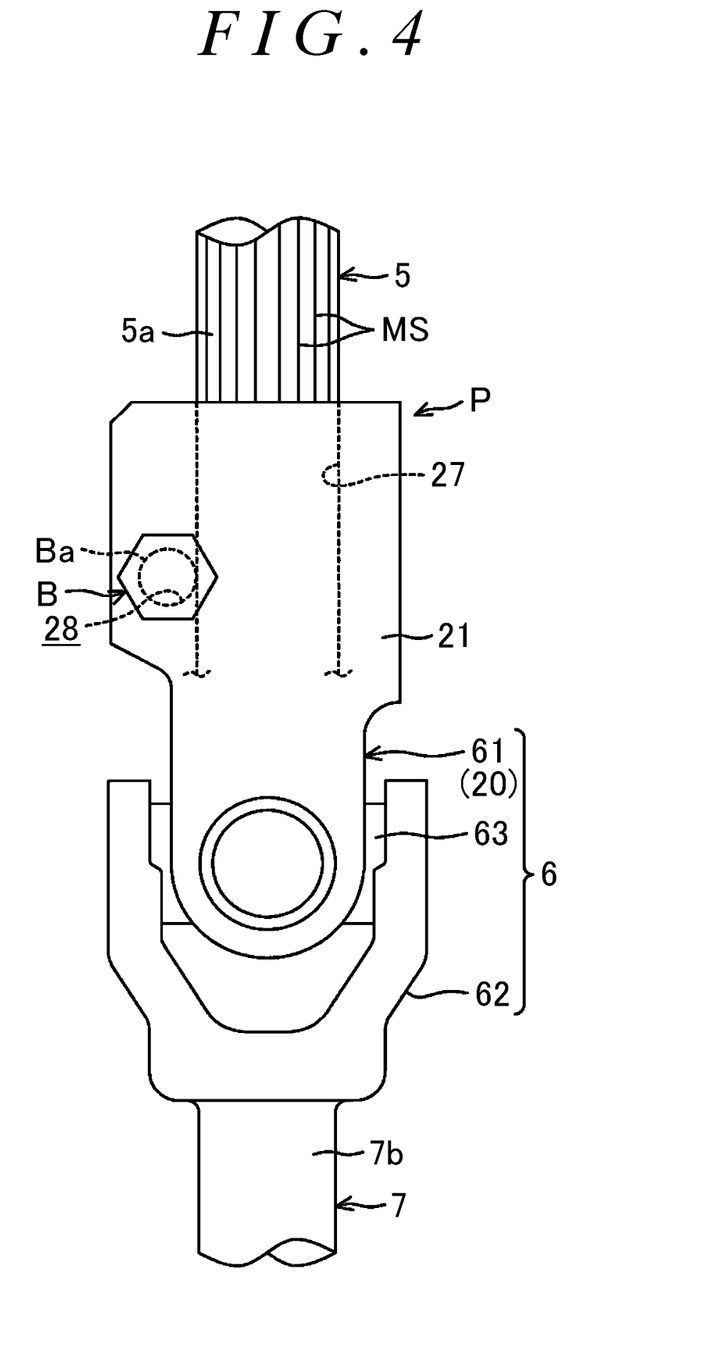
FIG. 4 is a schematic side view of a connecting structure between a rotating element and a rotating shaft according to a second embodiment of the present invention.

When the steering member 2 is operated to rotate the steering shaft 3, this rotation is converted into a motion of the rack shaft 8 along the axial direction W1 by the pinion 7a and the rack 8a. Hereby, steering of the steered wheels 11 is attained. As illustrated in FIG. 4, the second universal joint 6 includes a first universal joint yoke 61 (corresponding to the universal joint yoke 20 manufactured by the manufacturing method of the first embodiment), a second universal joint yoke 62, and a joint cross 63. The joint cross 63 connects the first universal joint yoke 61 to the second universal joint yoke 62.

An end portion 5a of the intermediate shaft 5 is connected to a fitting portion 21 of the first universal joint yoke 61. That is, the connecting structure P between the rotating element and the rotating shaft is applied to a connecting structure between the first universal joint yoke 61 as the rotating element and the intermediate shaft 5 as the rotating shaft. A male serration MS to mesh with a female serration 27 of a fitting portion 21 is formed on an outer periphery of the end portion 5a of the intermediate shaft 5.

A screw thread shaft Ba of a fastening bolt B is inserted into a bolt insertion hole 28 of the fitting portion 21. The screw thread shaft Ba is screwed into a screw thread hole (corresponding to the screw thread hole 29 in FIG. 2: not shown herein). An end portion 7b of the pinion shaft 7 is fixed to the second universal joint yoke 62. In the connecting structure P and the steering apparatus 1, a tooth contact between the male serration MS and the female serration 27 improves and durability thereof improves.

The manufacturing method of the rotating element according to the present invention can be applied to manufacturing methods of other rotating elements having a fitting portion in which a female serration is formed on an inner peripheral surface, as well as the universal joint yoke 20. Further, the connecting structure P between the rotating element and the rotating shaft according to the present invention may be applied to a connecting structure between the steering shaft 3 and a universal joint yoke of the first universal joint 4 in the steering apparatus 1, or a connecting structure between the pinion shaft 7 and the second universal joint yoke 62 of the second universal joint 6 in the steering apparatus 1.

In addition, the present invention can be modified variously within a scope of claims of the present invention.

What is claimed is:

1. A manufacturing method of a rotating element including a cylindrical fitting portion having a pair of circumferential end portions forming an axial slit between the circumferential end portions, the cylindrical fitting portion being serration-fitted to a rotating shaft, the manufacturing method comprising:
   clamping the fitting portion by a clamp jig so that the fitting portion is elastically deformed in an elliptical shape that is flat in a predetermined radial direction toward the axial slit;
   forming a female serration arranged in an elliptical shape by use of a tool having an elliptical section with a short diameter in the predetermined radial direction, the female serration being formed on an inner peripheral surface of the fitting portion clamped by the clamp jig so as to be elastically deformed in the elliptical shape; and
   releasing the clamping by the clamp jig so that the arrangement of the female serration is changed to a perfect-circle shape from the elliptical shape.

2. The manufacturing method according to claim 1, wherein:
   a difference between a long diameter and a short diameter of an ellipse formed by the inner peripheral surface of the fitting portion clamped by the clamp jig is equal to a difference between a long diameter and a short diameter of an ellipse formed by the tool.

3. The manufacturing method according to claim 1, wherein
   the difference between the long diameter and the short diameter of the ellipse formed by the tool is larger than a deviation amount of the difference between the long diameter and the short diameter of the ellipse formed by the inner peripheral surface of the fitting portion clamped by the clamp jig.

* * * * *